(12) United States Patent
Jones (10) Patent No.: US 9,752,375 B2
(45) Date of Patent: Sep. 5, 2017

(54) METHOD AND APPARATUS FOR INSTALLING VACUUM INSULATED GLASS (VIG) WINDOW UNIT IN EXISTING WINDOW SASH

(75) Inventor: Jeffrey A. Jones, Ann Arbor, MI (US)

(73) Assignee: Guardian Glass, LLC, Auburn Hills, MI (US)

( * ) Notice: Subject to any disclaimer, the term of this patent is extended or adjusted under 35 U.S.C. 154(b) by 294 days.

(21) Appl. No.: 13/541,840

(22) Filed: Jul. 5, 2012

(65) Prior Publication Data

US 2014/0007396 A1    Jan. 9, 2014

(51) Int. Cl.
 - *E06B 3/58* (2006.01)
 - *E06B 3/267* (2006.01)
 - *E06B 3/66* (2006.01)

(52) U.S. Cl.
CPC .............. *E06B 3/585* (2013.01); *E06B 3/267* (2013.01); *E06B 3/5821* (2013.01);
(Continued)

(58) Field of Classification Search
CPC ........ E06B 3/585; E06B 3/267; E06B 3/5821; E06B 3/5842; E06B 3/5857; E06B 3/62; E06B 3/6612; E06B 2003/6223; E06B 2003/6238; E06B 2003/625; E06B 2003/6264; E06B 2003/627; E06B 2003/6276; Y10T 29/49723; Y10T 29/4973; Y10T 29/49732
(Continued)

(56) References Cited

U.S. PATENT DOCUMENTS

| 2,716,784 | A | * | 9/1955 | Kuyper | .................... | 52/204.705 |
| 3,803,779 | A | * | 4/1974 | Kuyper et al. | .................... | 52/99 |

(Continued)

FOREIGN PATENT DOCUMENTS

| DE | 2 245 303 | 3/1974 |
| DE | 25 30 936 | 1/1977 |

(Continued)

OTHER PUBLICATIONS

Machine English translation of DE 2020090166113.*
(Continued)

*Primary Examiner* — Jason L Vaughan
*Assistant Examiner* — Amanda Meneghini
(74) *Attorney, Agent, or Firm* — Nixon & Vanderhye P.C.

(57) ABSTRACT

A method and apparatus for enabling a vacuum insulated glass (VIG) window to be substituted for and/or replace a non-vacuum insulated glass window in an existing window assembly frame structure is disclosed. A width of a VIG window is substantially less than that of existing non-vacuum insulated glass (IG) windows (e.g., a double, triple or quad pane windows). A replacement stop is provided that compensates for the difference between the larger width of a non-vacuum insulated glass window and a VIG window which has a smaller width, thereby enabling the VIG window to be easily and cost effectively installed in existing window configurations originally intended for non-vacuum insulated glass windows. The replacement stop may be used in the manufacture of VIG window units and/or to replace existing and/or already installed non-vacuum insulated glass windows.

17 Claims, 6 Drawing Sheets

(52) U.S. Cl.
CPC ......... *E06B 3/6612* (2013.01); *Y10T 29/4973* (2015.01); *Y10T 29/49723* (2015.01); *Y10T 29/49826* (2015.01)

(58) Field of Classification Search
USPC ... 29/401.1, 402.04, 402.08, 402.09, 402.11; 52/204.56, 204.67, 204.7, 207.705, 52/207.71, 786.13, 788.1; 49/501, 504, 49/505
See application file for complete search history.

(56) References Cited

U.S. PATENT DOCUMENTS

| | | | |
|---|---|---|---|
| 3,837,866 A | | 9/1974 | Malmendier et al. |
| 3,995,405 A | * | 12/1976 | Peterson ................ E06B 3/585 52/476 |
| 4,256,495 A | | 3/1981 | Kawamura et al. |
| 4,494,342 A | * | 1/1985 | Decker ................ E06B 3/5418 52/203 |
| 4,743,302 A | | 5/1988 | Dumesnil et al. |
| 4,897,975 A | * | 2/1990 | Artwick ................ E06B 3/5892 52/208 |
| 5,014,466 A | * | 5/1991 | Winner ............................ 49/504 |
| 5,051,381 A | | 9/1991 | Ohji et al. |
| 5,156,894 A | | 10/1992 | Hood et al. |
| 5,308,662 A | | 5/1994 | Woodard et al. |
| 5,388,372 A | * | 2/1995 | Zanoni ..................... E06B 7/14 49/381 |
| 5,412,922 A | * | 5/1995 | Vittori et al. .............. 52/745.16 |
| 5,491,940 A | * | 2/1996 | Bruchu ............................ 52/213 |
| 5,534,469 A | | 7/1996 | Hayashi |
| 5,657,607 A | | 8/1997 | Collins et al. |
| 5,664,395 A | | 9/1997 | Collins et al. |
| 5,687,519 A | * | 11/1997 | Bruchu ............................ 52/213 |
| 5,784,853 A | | 7/1998 | Hood et al. |
| 5,902,652 A | | 5/1999 | Collins et al. |
| 6,014,872 A | | 1/2000 | Hartig et al. |
| 6,052,965 A | | 4/2000 | Florentin et al. |
| 6,105,336 A | | 8/2000 | Katoh et al. |
| 6,383,580 B1 | | 5/2002 | Aggas |
| 6,408,574 B1 | * | 6/2002 | Farrar ................... B60J 1/2094 49/358 |
| 6,478,911 B1 | | 11/2002 | Wang et al. |
| 6,632,491 B1 | | 10/2003 | Thomsen et al. |
| 6,692,600 B2 | | 2/2004 | Veerasamy et al. |
| 6,701,749 B2 | | 3/2004 | Wang et al. |
| 6,745,523 B2 | * | 6/2004 | Petta ........................ E06B 1/34 52/213 |
| 6,782,718 B2 | | 8/2004 | Lingle et al. |
| 6,827,977 B2 | | 12/2004 | Veerasamy |
| 7,082,736 B2 | * | 8/2006 | Farrar ................... B60J 1/2094 52/202 |
| 7,331,146 B1 | * | 2/2008 | Beutler et al. ............. 52/204.56 |
| 7,425,518 B2 | | 9/2008 | Yoshida et al. |
| 7,763,334 B2 | * | 7/2010 | Berkowitz ........... E06B 3/5418 428/34 |
| 7,851,034 B2 | | 12/2010 | Cooper |
| 8,101,278 B2 | | 1/2012 | Laird |
| 8,137,494 B2 | | 3/2012 | Cooper et al. |
| 8,202,587 B2 | | 6/2012 | Wang |
| 8,227,055 B2 | | 7/2012 | Wang |
| 8,683,775 B1 | * | 4/2014 | Jones ......................... 52/786.13 |
| 2002/0078640 A1 | * | 6/2002 | Petta ........................ E06B 1/34 52/204.1 |
| 2005/0233885 A1 | | 10/2005 | Yoshida et al. |
| 2007/0148379 A1 | | 6/2007 | Theios et al. |
| 2014/0069034 A1 | * | 3/2014 | Jones .......................... 52/171.3 |
| 2014/0072735 A1 | * | 3/2014 | Jones .............................. 428/34 |

FOREIGN PATENT DOCUMENTS

| | | | | |
|---|---|---|---|---|
| DE | 27 04 808 | | 8/1978 | |
| DE | 90 16 708.2 | | 2/1991 | |
| DE | 42 41 309 | | 6/1994 | |
| DE | 202009016113 U1 | * | 5/2011 | ............ E06B 3/58 |
| DE | 102013202998 A1 | * | 10/2013 | ............ E06B 3/222 |
| EP | 0 244 494 | | 11/1987 | |
| EP | 0 566 070 | | 10/1993 | |
| EP | 0 717 164 | | 6/1996 | |
| GB | 2408283 A | * | 5/2005 | ............ E06B 3/5821 |
| GB | 2 467 649 | | 8/2010 | |
| JP | 10-306660 | | 11/1998 | |
| JP | 2011-111838 | | 6/2011 | |

OTHER PUBLICATIONS

English machine translation of EP 0566070 published Oct. 20, 1993.*
U.S. Appl. No. 13/484,597, filed May 31, 2012; Dennis et al.
U.S. Appl. No. 13/466,356, filed May 8, 2012; Jones.
International Search Report for PCT/US2013/047227.
U.S. Appl. No. 13/606,096, filed Sep. 7, 2012; Jones.
International Search Report mailed Dec. 4, 2013.

* cited by examiner

METHOD AND APPARATUS FOR INSTALLING VACUUM INSULATED GLASS (VIG) WINDOW UNIT IN EXISTING WINDOW SASH

TECHNICAL FIELD

The disclosure relates generally to vacuum insulated glass (VIG) window unit installation configurations and methods for installing a VIG window unit in an existing window sash configuration or in a new window structure. The disclosure more particularly relates to configurations of the sash and components thereof that would enable a VIG window unit to be installed without removing and/or replacing the entire sash previously used during installation of different window types, such as, for example, a multi pane non-vacuum insulated glass unit having a greater cross-sectional width than a VIG window unit. The disclosure relates to a structural arrangement of a window stop to be used with an existing sash such that the stop compensates for a difference in cross-sectional width of a multi pane non-vacuum insulated glass window unit and a VIG window unit allowing the multi pane insulated glass (IG) window unit to be replaced with a much thinner VIG window unit without requiring replacement of the entire sash and/or entire window support structure. The disclosure also relates to methods for replacing insulated glass (IG) window units with VIG window units. The disclosure is not limited to replacing IG windows with VIG windows, as it is also related to sash and stop structure(s) designed for new VIG window units.

BACKGROUND AND SUMMARY OF EXAMPLE EMBODIMENTS

Vacuum insulating glass (VIG) units typically include two spaced apart glass substrates that enclose an evacuated or low-pressure space/cavity therebetween. The substrates are interconnected by a peripheral edge seal and typically include spacers/pillars between the glass substrates to maintain spacing between the glass substrates and to avoid collapse of the glass substrates that may be caused due to the low pressure environment that exists between the substrates. Some example VIG configurations are disclosed, for example, in U.S. Pat. Nos. 5,657,607, 5,664,395, 5,657,607, 5,902,652, 6,506,472 and 6,383,580, the disclosures of which are all hereby incorporated by reference herein in their entireties.

Figure 1:
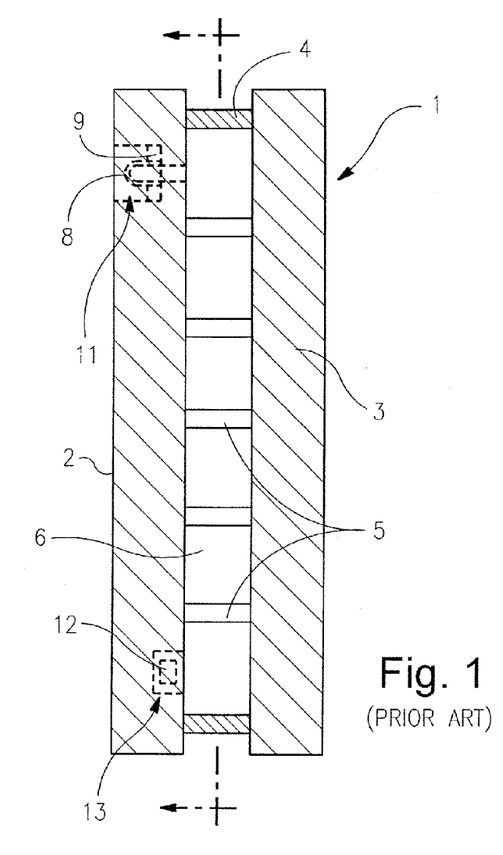
FIG. 1 is a cross sectional schematic diagram of a conventional VIG unit.
Figure 2:
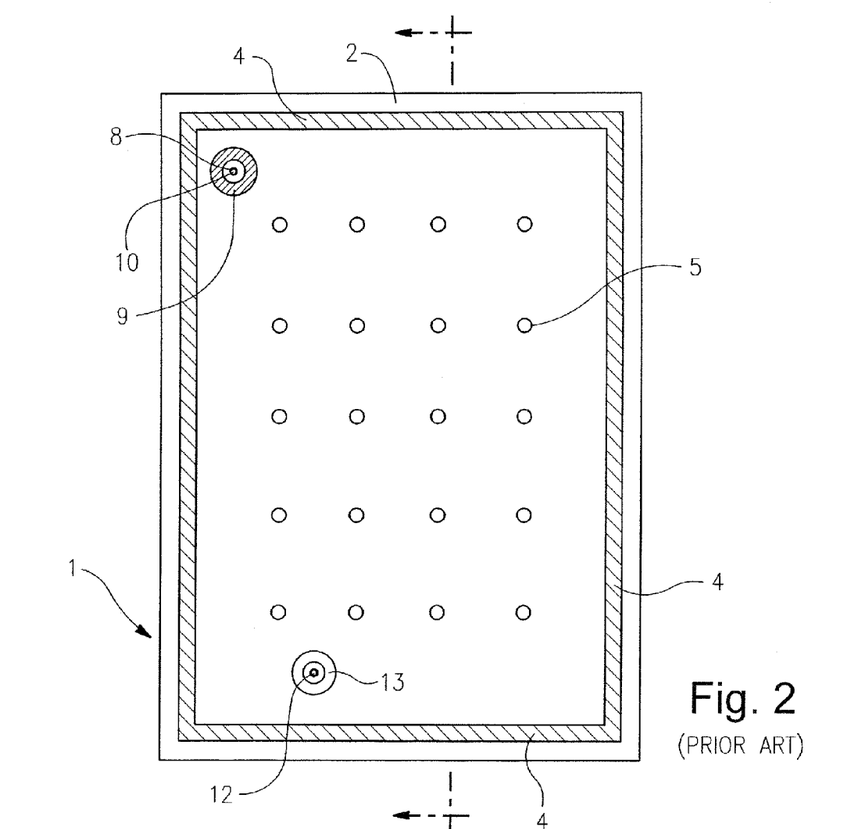
FIG. 2 is a top plan view of a conventional VIG unit.

FIGS. 1 and 2 illustrate a typical VIG window unit 1 and elements that form the VIG window unit 1. For example, VIG unit 1 may include two spaced apart substantially parallel glass substrates 2, 3, which enclose an evacuated low-pressure space/cavity 6 therebetween. Glass sheets or substrates 2,3 are interconnected by a peripheral edge seal 4 which may be made of fused solder glass or the like, for example. An array of support pillars/spacers 5 may be included between the glass substrates 2, 3 to maintain the spacing of substrates 2, 3 of the VIG unit 1 in view of the low-pressure space/gap 6 present between the substrates 2, 3.

A pump-out tube 8 may be hermetically sealed by, for example, solder glass 9 or the like to an aperture/hole 10 that passes from an interior surface of one of the glass substrates 2 to the bottom of an optional recess 11 in the exterior surface of the glass substrate 2, or optionally to the exterior surface of the glass substrate 2. A vacuum is attached to pump-out tube 8 to evacuate the interior cavity 6 to a low pressure that is less than atmospheric pressure, for example, using a sequential pump down operation. After evacuation of the cavity 6, a portion (e.g., the tip) of the tube 8 is melted to seal the vacuum in low pressure cavity/space 6. The optional recess 11 may retain the sealed pump-out tube 8. Optionally, a chemical getter 12 may be included within a recess 13 that is disposed in an interior face of one of the glass substrates, e.g., glass substrate 2. The chemical getter 12 may be used to absorb or bind with certain residual impurities that may remain after the cavity 6 is evacuated and sealed.

VIG units with fused solder glass peripheral edge seals 4 are typically manufactured by depositing glass frit or other suitable material, in a solution (e.g., frit paste), around the periphery of substrate 2 (or on substrate 3). This glass frit paste ultimately forms the edge seal 4. The other substrate (e.g., 3) is brought down on substrate 2 so as to sandwich spacers/pillars 5 and the glass frit solution between the two substrates 2, 3. The entire assembly including the glass substrates 2, 3, the spacers/pillars 5 and the seal material (e.g., glass frit in solution or paste), is then heated to a temperature of at least about 500° C., at which point the glass frit melts, wets the surfaces of the glass substrates 2, 3, and ultimately forms a hermetic peripheral/edge seal 4.

After formation of the edge seal 4 between the substrates, a vacuum is drawn via the pump-out tube 8 to form low pressure space/cavity 6 between the substrates 2, 3. The pressure in space 6 may be produced by way of an evacuation process to a level below atmospheric pressure, e.g., below about $10^{-2}$ Torr. To maintain the low pressure in the space/cavity 6, substrates 2, 3 are hermetically sealed via the edge seal and sealing off of the pump-out tube. Small high strength spacers/pillars 5 are provided between the transparent glass substrates to maintain separation of the approximately parallel glass substrates against atmospheric pressure. As noted above, once the space 6 between substrates 2, 3 is evacuated, the pump-out tube 8 may be sealed, for example, by melting its tip using a laser or the like.

VIG window units are generally much more efficient insulators than typical multi pane non-vacuum insulated glass window units (e.g., double, triple, quad pane insulated glass window units). VIG window units are also significantly thinner than a non-vacuum insulated glass window (hereinafter "insulated glass" of IG) unit. Because of this difference in thickness, a typical window installation structure, e.g., a window sash, may need to be entirely redesigned to effectively utilize and accept a VIG window unit. This may also result in replacement of the entire window sash and modification of the frame structure surrounding the sash in order to effectively replace existing insulated glass window units with the much more efficient, thinner, and higher performance VIG window units. Redesigning the window structure and replacing the window sash is costly and time consuming and may contribute to slow adoption of VIG window units, especially in existing buildings or by smaller manufacturers, in spite of the many benefits and advantages attendant with VIG window units.

In order to improve the adoption, for example in existing buildings, of VIG window units in place of existing multi pane insulated glass IG window units, what is needed is an inexpensive and simple method and structural arrangement for installing VIG window units in existing insulated glass (IG) window unit mounting structures. To this end, the inventors have developed a re-profiled replacement window stop for a window unit that takes up the difference in thickness between a multi pane non-vacuum insulated glass window unit and a VIG window unit with little modification to existing window designs, including the window sash.

By providing a re-profiled replacement window stop that takes up the difference in thickness between a multi pane insulated glass window unit and a VIG window unit, one or more advantages may be realized. Among these are, for example, and without limitation, encouraging adoption of high-efficiency high-performance VIG window units, reducing the amount of time for adoption of VIG window units by window manufacturers, providing the ability to implement VIG window units in current window designs with little or no modification of the sash structure, providing the ability for low-volume window manufacturers to adopt VIG window units, minimal tooling required for window manufacturers, maintaining the appearance of the window features and aesthetics, and/or the ability to use readily available materials that match current window aesthetics.

According to certain example embodiments, a re-profiled replacement VIG window stop is provided that takes up the difference in thickness between existing insulated glass window units and VIG window units, and is readily installed or integrated with existing window sash designs. To that end, the re-profiled VIG window stop is arranged to easily and readily replace the existing IG window stop used for multi pane insulated glass window units. Additionally, the re-profiled replacement VIG window stop may include an air gap or additional insulation in a hollow portion thereof to improve thermal performance of the VIG window unit.

In certain example embodiments of this invention, there is provided a method of making a vacuum insulated glass (VIG) window unit, the method comprising: seating a VIG window on a window sash, the window sash capable of supporting a non-vacuum insulating glass window which has a larger width than does the VIG window, said VIG window being supported on a first side by a stop portion of said window sash and having a width less than the width of said non-vacuum insulated glass window; and installing a VIG stop so that the VIG stop is connected to said window sash and supports a second side of said VIG window opposite said first side, wherein said VIG stop has a width sufficient to compensate for a difference in the width of said non-vacuum insulated glass window and said VIG window.

In certain example embodiments, there is provided by a method of replacing a non-vacuum insulated glass window with a vacuum insulated glass (VIG) window having a width less than a width of said non-vacuum insulated glass window, comprising: removing a stop connected to a window sash in which said non-vacuum insulated glass window is installed; removing said non-vacuum insulated glass window from said window sash; installing said VIG window in said window sash; and installing a second stop having a width sufficient to compensate for a difference in a width of the removed non-vacuum insulated glass window and a width of said VIG window, said second stop engaging a surface of said VIG window and providing lateral support to said VIG window.

These and other embodiments and advantages are described herein with respect to certain example embodiments and with reference to the following drawings in which like reference numerals refer to like elements, and wherein:

DETAILED DESCRIPTION OF EXAMPLE EMBODIMENTS

Certain example embodiments will be described in detail herein with reference to the foregoing drawings in which like reference numerals refer to like elements. It will be understood that the embodiments described herein are intended to be illustrative, not limiting, and that those skilled in the art will understand that various modifications may be made without departing from the true spirit and full scope of the claims appended hereto.

Figure 3:
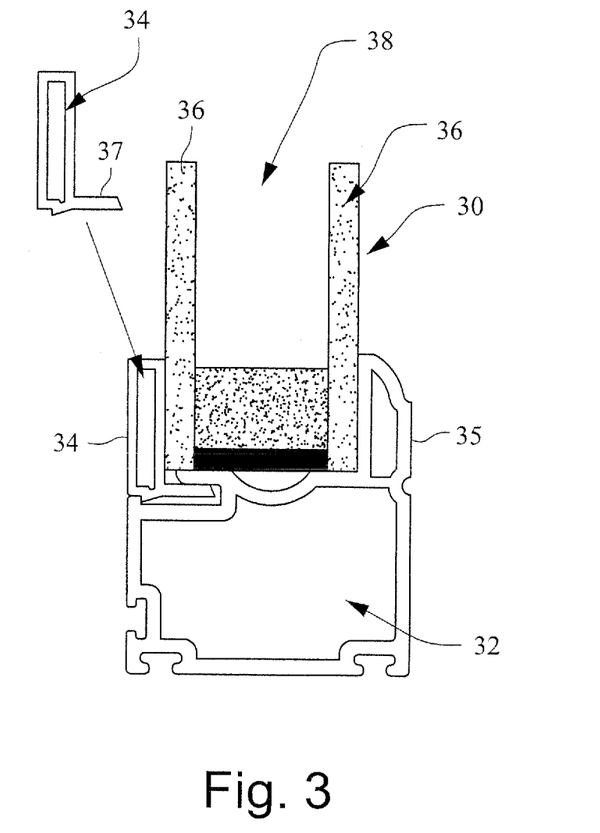
FIG. 3 is a schematic partial cross sectional diagram illustrating a window sash profile, original/existing window stop and insulated glass configuration.

With reference to FIG. 3, a schematic partial cross sectional diagram illustrating a window sash profile, original/existing window stop and insulated glass window configuration is illustrated. The insulated glass (IG) unit 30, which may, for example, and without limitation, include two panes of glass 36 defining an air or gas-filled gap 38, is seated in a window sash 32. In the IG window unit, the gap 38 between the glass substrates is typically air and/or gas filled, and is at approximately atmospheric pressure unlike a VIG window. The window sash 32, may include a first stop portion 35 that is part of and integral with the sash 32. An existing second stop 34 that may include a clip 37, or other extending portion 37 for connecting the stop 34 to the sash 32 may also be included. The insulated glass unit 30 is supported by the sash 32, and held in place by the existing stops 34, 35. A distance between the stops 34 and 35 preferably corresponds to the thickness of the insulated glass (IG) unit 30. Non-vacuum insulated glass windows typically have widths or about 20 mm or more depending on the number of glass panes (e.g., 2, 3 or 4) used.

During manufacture or window replacement, the insulated glass unit 30 is placed on the sash 32 and against the first stop 35. When the insulated glass (IG) unit 30 has been properly seated in the sash 32 and is engaged with the first stop portion 35, the second stop 34 is connected to the sash 32, for example, via the clip or extended portion 37. The second stop 34 and the first stop 35 act to provide lateral support to the IG window unit 30. The window sash 32, first stop portion 35 and second stop 34 may be made of any suitable material, including, for example, and without limitation, PVC, fiberglass, wood, rubber, aluminum, various composites, or the like. As noted above, the width of a typical insulated glass (IG) window unit 30 is in a range of about 20 mm or greater depending on the type of insulated glass window. Accordingly, the gap between the first and second stops 35, 34 may typically be in a similar range such as at least about 20 mm, more preferably at least about 25 or 30 mm.

Figure 4:
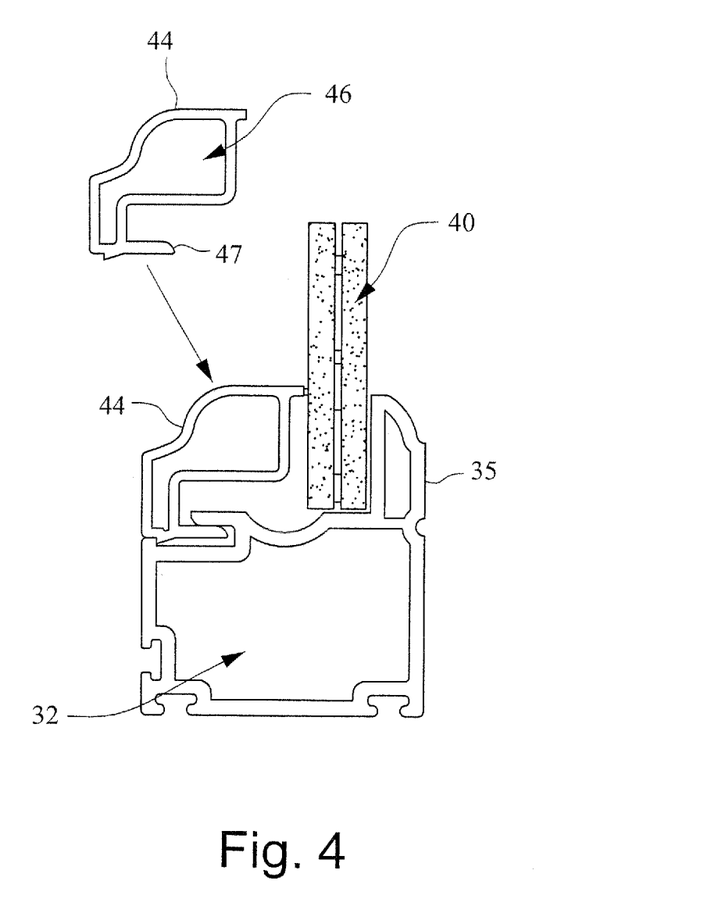
FIG. 4 is a schematic partial cross sectional diagram illustrating a window sash profile, re-profiled window stop and VIG window unit configuration according to an example embodiment.

FIG. 4 is a schematic partial cross sectional diagram illustrating a window sash profile from FIG. 3, re-profiled replacement VIG window stop and VIG window unit configuration according to an illustrative, non-limiting, example embodiment. According to this example embodiment, the insulated glass unit 30 shown in FIG. 3 is substituted by or replaced with a VIG window 40. According to certain example embodiments, the sash 32 and first stop portion 35 remain the same as in FIG. 3. However, the second stop 34 of FIG. 3 may be replaced with a re-profiled replacement VIG stop 44 having a substantially larger width which is sufficient to take up the difference between the large thickness of the original insulated glass unit 30 and the much smaller thickness of the VIG unit 40. For example, and without limitation, a typical insulated glass (IG) unit 30 may be in the range of about 20 mm thick or greater, while a VIG unit may have a thickness in a range of about 8 mm thick or greater, but typically less than 10 mm. Accordingly, the IG window 30 has a width of at least 5 mm greater (more preferably at least 10 mm greater) than a width of the VIG window 40. Thus, in example embodiments of this invention, the VIG stop 44 has a width of at least 5 mm greater (more preferably at least 10 mm greater) than a width of the existing stop 34. Accordingly, the re-profiled replacement stop 44 preferably has a width that makes up the difference in thickness between the original IG window and the VIG window that is to replace the IG window, e.g., in a range of about 12-32 mm, or more preferably in a range of about 12-22 mm, or even more preferably in a range of about 12-14 mm. Because of the increased width of the re-profiled replacement VIG stop 44 as compared to the original IG stop 34, the re-profiled replacement stop 44 may also be configured to include a hollow portion or air gap 46, and/or a larger hollow portion or air gap 46 than any provided in the original/existing stop 34. Advantageously, the air gap 46 may provide additional and improved thermal performance. Alternatively, the air gap 46 may be filled with an insulating material, such as, for example, and without limitation, insulating foam (not shown) to further improve the performance of the VIG window unit 40. The VIG stop 44 may also include a clip or extended portion 47 that is configured to engage the existing sash 32 in a manner similar to that of the clip or extension 37 of the removable original/existing stop 34. The sash 32 also includes a concave dimple defined in an upper surface of the window sash when viewed in cross section, the concave dimple is positioned so as to be located between and not directly under the first and second glass substrates of the non-vacuum insulated glass window, and so that at least part of the first and second glass substrates of the VIG window are located on one side of the dimple when the VIG window is on the sash. For example, FIG. 3 illustrates that the concave dimple is positioned so as to be located between and not directly under the first and second glass substrates 36 of the non-vacuum insulated glass window, and FIG. 4 illustrates that the concave dimple is positioned so that at least part of the first and second glass substrates of the VIG window are located to the right side of the dimple when the VIG window is on the sash.

During manufacture or window replacement, the insulated glass (IG) unit 30 is substituted with or replaced by the VIG window 40, which is placed on the sash 32 and against (directly or indirectly) the first stop portion 35. When the VIG window 40 has been properly seated in the sash 32 and is engaged with the first stop portion 35, the selectively engageable re-profiled VIG stop 44 is connected to the sash 32, for example, via the clip or extended portion 47 thereof in a male/female connection relationship. The VIG stop 44 may engage the VIG window unit 40 and act with the first stop 35 to provide lateral support to the VIG unit 40. The window sash 32, first stop portion 35 and re-profiled VIG stop 44 may be made of any suitable material, including, for example, and without limitation, PVC, fiberglass, wood, rubber, aluminum, various composites, or the like. As noted above, the width of a typical VIG unit 40 is in a range of about 8 mm or greater (e.g., from about 8-14 mm, more preferably from about 8-12 mm, and most preferably from about 8-10 mm). Accordingly, the gap between the first stop portion 35 and re-profiled stop 44 may typically be in a similar range. According to certain preferred example embodiments, the re-profiled stop 44 may be installed toward the exterior of a building or structure in which the VIG unit 40 is installed. However, it will be understood that the re-profiled stop 44 may also face the interior of a building or structure in which the VIG unit 40 is installed.

Figure 5:
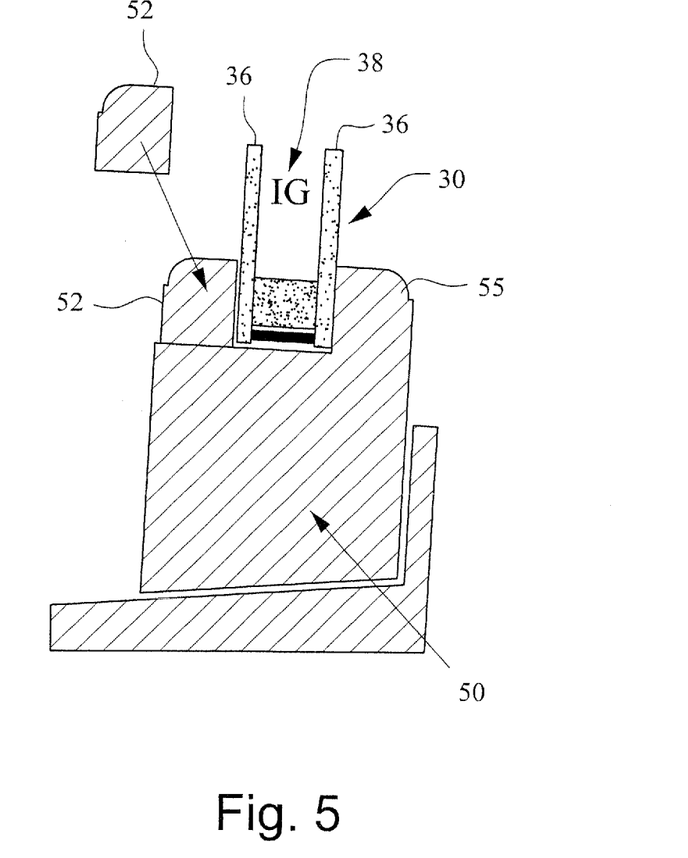
FIG. 5 is a schematic partial cross sectional diagram illustrating a window sash profile, original/existing window stop and insulated glass configuration for a wooden window sash configuration.

FIG. 5 is a schematic partial cross sectional diagram illustrating a window sash profile, original window stop and insulated glass (IG) configuration for an example wooden window sash configuration. The insulated glass unit 30, which may, for example, and without limitation, include two panes of glass 36 defining an air gap 38, is seated in a window sash 50 that is, for example, made substantially entirely of wood. The IG window unit 30 is similar to that described above in connection with FIG. 3. The window sash 50, may include an integral first existing stop portion 55 that is part of and integral with the sash 50. A second/existing stop 52 that is configured to engage the window sash 50 on one edge and the insulated glass (IG) unit 30 on another edge to provide lateral support to the IG window unit 30 is also be included. The insulated glass unit 30 is supported by the sash 50, and held in place by the stop portion 55 and the second stop 52. A distance between the stop portion 55 and the stop 52 preferably corresponds to the thickness of the insulated glass (IG) window unit 30.

During manufacture or window replacement, the insulated glass unit 30 is placed on the sash 50 and against the stop portion 55. During replacement, the existing stop 52 is to be removed. When the insulated glass (IG) window unit 30 has been properly seated in the sash 50 and is engaged with the stop portion 55, the second stop 52 is engaged with and/or connected to the sash 50. The second stop 52 and the stop portion 55 act to provide lateral support to the insulated window unit 30 as shown in FIG. 5. The window sash 50, stop portion 55 and second stop 52 in this example are made of wood, but it will be understood that they may be made of any suitable material, including, for example, and without limitation, PVC, fiberglass, wood, rubber, aluminum, various composites, or the like. As noted above, the width of a typical insulated glass (IG) unit 30 is as described above, e.g., in a range of about 20 mm or greater. Accordingly, the gap between the stop portion 55 and the second/existing stop 52 may typically be in a similar range as described above in connection with FIGS. 3-4.

Figure 6:
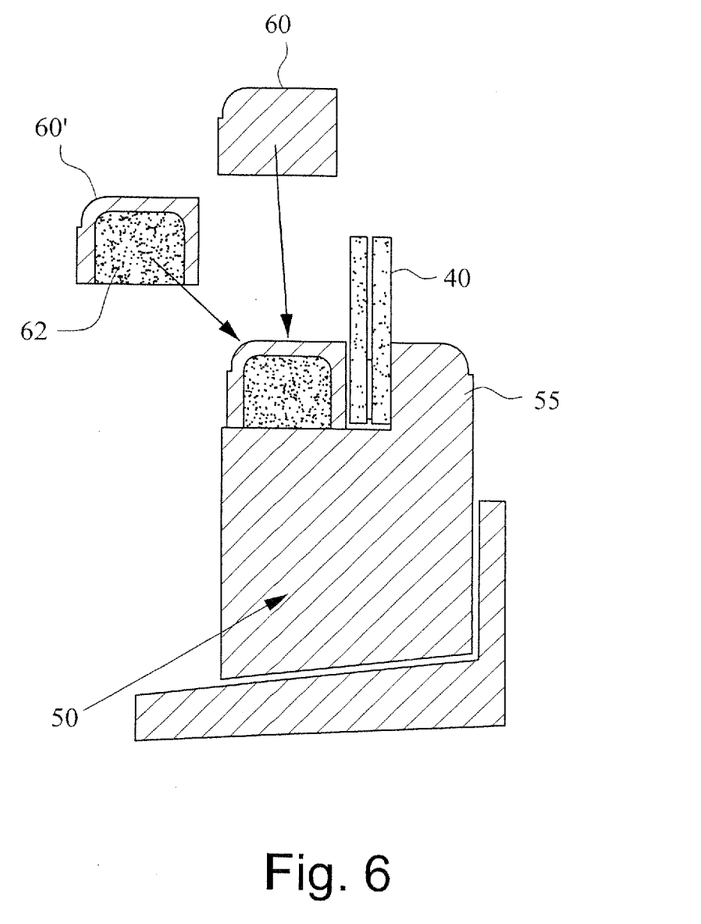
FIG. 6 is a schematic partial cross sectional diagram illustrating a window sash profile, re-profiled window stop and VIG window unit configuration for the configuration illustrated in FIG. 5 according to another example embodiment.

FIG. 6 is a schematic partial cross sectional diagram illustrating a window sash profile from FIG. 5, with a re-profiled replacement window stop and VIG window unit configuration for the configuration illustrated in FIG. 5 according to another illustrative, non-limiting, example embodiment. According to this example embodiment, the insulated glass (IG) unit 30 shown in FIG. 5 is substituted by or replaced with a VIG window unit 40. The sash 50 and stop portion 55 remain the same. However, the second stop 52 of FIG. 5 is replaced by or substituted with a re-profiled VIG stop 60 having a width sufficient to take up the difference between the thickness of the original insulated glass unit 30 and the VIG unit 40. The width of the VIG stop 60 can be the same as the width of the VIG stop 44 described above in connection with FIG. 4. For example, and without limitation, a typical insulated glass unit 30 may be in the range of about 20 mm thick or greater, while a VIG unit 40 may have a thickness in a range of about 8 mm thick or greater, but typically less than 10 mm. Accordingly, the re-profiled stop 60 preferably has a width that makes up this difference, e.g., in a range of about 12-32 mm, or more preferably in a range of about 12-22 mm, or even more preferably in a range of about 12-14 mm. Because of the increased width of the re-profiled replacement VIG stop 60 as compared to the original/existing stop 52, the re-profiled replacement VIG stop 60 may also be configured 60' to include a hollow portion or air gap 62. Advantageously, the air gap 62 may be filled with an insulating material, such as, for example, and without limitation, insulating foam (not shown) to further improve the performance of the VIG window unit 40. The VIG stop 60 is configured to engage the existing sash 50 in a manner similar to that of the original second stop 52, or in any other suitable manner such as being connected thereto with glue, screws, nails and/or the like.

During manufacture or window replacement, the insulated glass unit 30 is placed on the sash 50 and against the original/existing stop portion 55. During replacement, the existing second stop 52 is to be removed and is to be replaced with VIG stop 60 (or 60'). In order to replace the IG window unit with a VIG window 40, the existing stop 52 is first removed and then the IG window 30 is removed. Then, the VIG window 40 is seated in the sash and up against (directly or indirectly) stop 55. Then, VIG stop 60 (or 60') is connected (e.g., via glue, screw(s), and/or nail(s)) to the sash in order to hold the VIG window in place. When the VIG window 40 is properly seated in the sash 50 and is engaged with the stop portion 55, the VIG stop 60 or 60' is engaged with the sash 50. The second stop 60 or 60' and the stop portion 55 act to provide lateral support to the VIG window 40. The window sash 50, stop portion 55 and VIG/second stop 60 or 60' in this example are made of wood, but it will be understood that they may be made of any suitable material, including, for example, and without limitation, PVC, fiberglass, wood, rubber, aluminum, various composites, or the like. The respective widths of the IG and VIG windows are as explained above in connection with FIGS. 3-4. Accordingly, the IG window 30 has a width of at least 5 mm greater (more preferably at least 10 mm greater) than a width of the VIG window 40. Thus, in example embodiments of this invention, the VIG stop 60 (or 60') has a width of at least 5 mm greater (more preferably at least 10 mm greater) than a width of the existing stop 52. Accordingly, the gap between the stop portion 55 and the VIG stop 60 or 60' may typically be in a similar range. According to certain preferred example embodiments, the re-profiled VIG stop 60 or 60' may face the exterior of a building or structure in which the VIG unit 40 is installed. However, it will be understood that the re-profiled stop 60 or 60' may also face the interior of a building or structure in which the VIG unit 40 is installed.

This invention is not limited to replacing IG windows with VIG windows. Certain example embodiments relate to sash and stop structure(s) designed for new VIG window units (not just for replacement applications). For example, the structures shown in FIGS. 4 and 6 herein can be used as new VIG window structures. The re-profiled stops 44, 60, 60' can be utilized in new window production in a window factory, such as utilizing VIG stops 44, 60, 60' as part of the overall sash and/or frame structure in the window factory for new VIG window structures. The new VIG stop (44, 60 or 60') is a quick technique for installing VIG windows in a sash designed for a much thicker IG window. This allows a window manufacturer to enter the VIG market faster, because only the stop and not the entire sash can be redesigned as explained herein.

Figure 7:
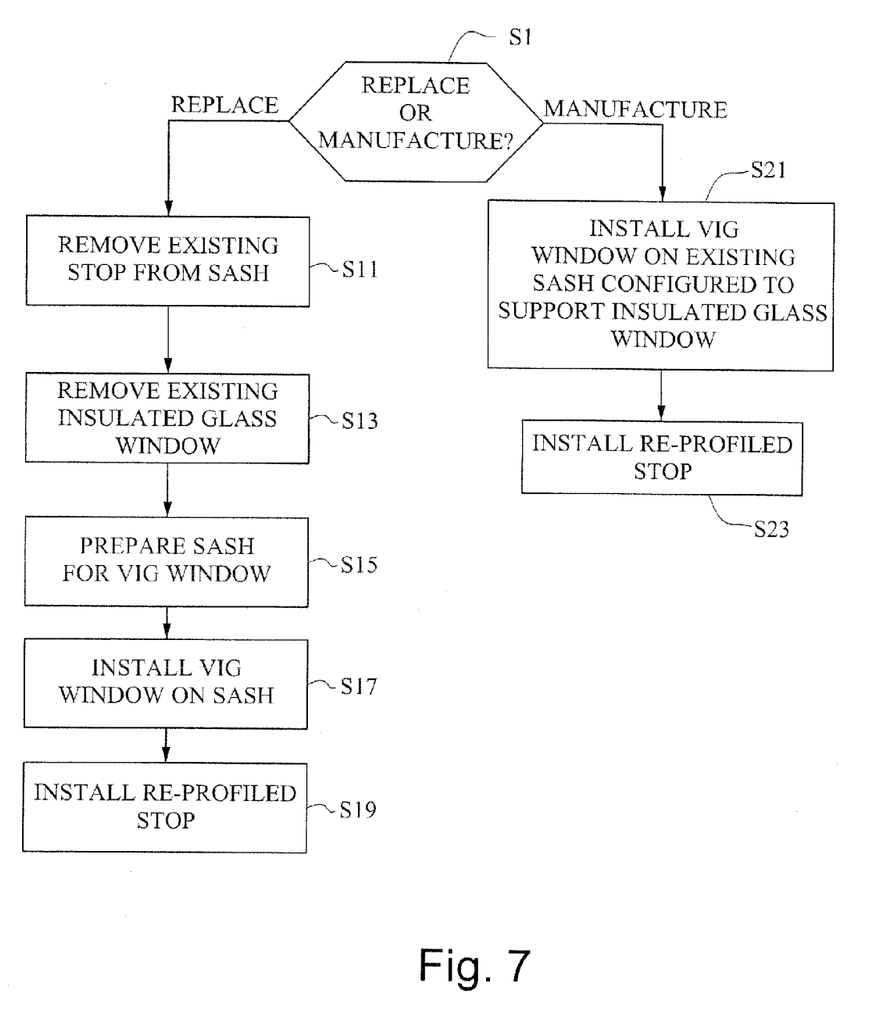
FIG. 7 is a flow chart illustrating a method of making or replacing an insulated glass (IG) window unit with a VIG window unit according to certain example embodiments.

FIG. 7 is a flowchart illustrating a method of manufacturing a window or replacing an existing window according to certain example non-limiting embodiments (in connection with FIGS. 3-6 for example). At the outset, a determination is made as to whether an existing insulated glass (IG) window is to be replaced with a VIG window unit or whether an existing sash and/or window support structure intended to be used with an insulated glass window is being used to manufacture a VIG window unit (S1). If replacement of an existing insulated glass window 30 with a VIG window 40 is to be performed, the existing second stop 34 or 52 is removed S11. Once the IG stop 34 or 52 is removed, the existing insulated glass window 30 is removed from the sash 32 or 50 in step S13. The sash 32 or 50 may then be prepared to accept a VIG window 40 by, for example, cleaning the sash, removing debris, removing old adhesive, removing existing seal or gasket materials or other materials that may have been used when the window was originally installed or manufactured S15. After the sash 32 or 50 has been prepared S15, a VIG window 40 may then be seated in the sash 32 or 50 using known techniques, including, for example, applying an adhesive if needed, a seal or gasket, or the like S17. Once the VIG window 40 is properly seated in the sash 32 or 50, the re-profiled VIG stop 44, 60 or 60' is then installed S19 to provide lateral support together with the existing stop portion 35 or 55. In the case of a sash structure 32, such as that illustrated in FIGS. 3 and 4, the VIG stop 44 may be connected to the sash via the clip portion 47 or any other suitable method. In the case of a sash structure 50 similar to that illustrated in FIGS. 5 and 6, the VIG stop 60 or 60' may be connected to the sash 50 for example by means of an adhesive or any other suitable method. In the foregoing manner, an existing insulated glass window 30 may be replaced with a VIG window 40 in a relatively simple and cost-effective manner that does not require re-designing the entire window support structure to accommodate a VIG window.

On the other hand, it will be appreciated that similar methods may be used to manufacture a VIG window unit using existing sash configurations that are originally intended to be used with multi pane non-vacuum insulated glass window configurations. In that case, the sash 32 or 50 is provided and a VIG window 40 is seated in the sash 32 or 50 in step S21. Once the VIG window 40 is seated in the sash 32 or 50, a VIG stop 44, 60 or 60' according to certain example embodiments may then be installed S23 to provide lateral support to the VIG window 40, together with the stop portion 35 or 55. In the case of a sash structure 32, such as that illustrated in FIGS. 3 and 4, the VIG stop 44 may be connected to the sash via the clip portion 47 or any other suitable method. In the case of a sash structure 50 similar to that illustrated in FIGS. 5 and 6 the stop 60 or 60' may be connected to the sash 50 for example by means of an adhesive or any other suitable method. In the foregoing manner, a sash designed for use with an insulated glass window may be used with a VIG window in a relatively simple and cost-effective manner that does not require re-designing the entire window support structure or sash to accommodate a VIG window.

According to certain example embodiments, the example re-profiled or VIG stops discussed above may be used on the outside facing side of the window. However, it will also be understood that the example re-profiled stops may be installed on an interior side of the window. As set forth above, it will also be understood that according to certain example embodiments, the stops can be made of any of a variety of materials, including, for example, and without limitation, wood, PVC, rubber, fiberglass, aluminum, vinyl, composites, plastics or any other suitable material. According to certain example embodiments, the example re-profiled stops may be designed and produced to match the existing window profiles, colors and attachment methods.

There are numerous benefits and advantages attendant with the disclosure and description herein, including, but not limited to one or more of encouraging the adoption of high-efficiency high-performance VIG windows, reducing the time to adoption of VIG windows, ability to implement VIG windows in current window designs with little or no significant modification, increased thermal performance for VIG window units using re-profiled stops with improved insulating properties, ability for low volume window manufacturers to adopt VIG, minimal tooling requirements, appearance of the window frame and interior may remain unchanged when using a re-profiled stop on the exterior, production with readily available materials, matching current window aesthetics, and the like to name a few.

In certain example embodiments of this invention, there is provided a method of making a vacuum insulated glass (VIG) window unit, the method comprising: seating a VIG window on a window sash, the window sash capable of supporting a non-vacuum insulating glass window which has a larger width than does the VIG window, said VIG window being supported on a first side by a stop portion of said window sash and having a width less than the width of said non-vacuum insulated glass window; and installing a VIG stop so that the VIG stop is connected to said window sash and supports a second side of said VIG window opposite said first side, wherein said VIG stop has a width sufficient to compensate for a difference in the width of said non-vacuum insulated glass window and said VIG window.

In the method of the immediately preceding paragraph, the method may include removing an existing stop from said window sash and replacing the existing stop with the VIG stop, said existing stop having supported a previously installed non-vacuum insulated glass window (such as an IG window where the space between the glass substrates is not evacuated and is not at lower pressure than atmospheric) with the larger width.

In the method of any of the preceding two paragraphs, the method may include, after removing the existing stop, removing a non-vacuum insulated glass window and thereafter seating the VIG window and installing the VIG stop to replace the existing stop.

In the method of any of the preceding three paragraphs, the method may include preparing said window sash to receive a VIG window. The preparing may comprise one, two, three, or all of: cleaning said sash to remove debris, cleaning said sash to remove adhesive residue, applying an adhesive to the sash, and/or providing a gasket or seal on said sash to receive said VIG window.

In the method of any of the preceding four paragraphs, said VIG stop may be installed to face an exterior side of said VIG window (i.e., face the exterior atmosphere outside the building), or alternatively may be installed to face an interior side of said VIG window (i.e., face the interior of the building in which the window is mounted).

In the method of any of the preceding five paragraphs, a width of said VIG stop may be in a range of from about 12 to 32 mm.

In the method of any of the preceding six paragraphs, a width of said VIG stop may be greater than a width of the existing stop that was used to support a non-vacuum insulated glass window.

In the method of any of the preceding seven paragraphs, said VIG stop may comprise a hollow portion defined by a plurality of sidewalls. The hollow portion may define an air gap and/or be filled with an insulating material.

In the method of any of the preceding eight paragraphs, the VIG stop may comprise at least one material from the group consisting of: wood, rubber, plastic, PVC, fiberglass, vinyl, aluminum, and composites.

In the method of any of the preceding nine paragraphs, the sash may comprise at least one material from the group consisting of: wood, rubber, plastic, PVC, fiberglass, vinyl, aluminum, and composites.

In the method of any of the preceding ten paragraphs, a gap defined by a minimum distance between said stop portion and said VIG stop may be substantially equal to the width of the VIG window.

While certain example embodiments have been described and disclosed herein, it will be understood that the embodiments described herein are intended to be illustrative, not limiting, and that those skilled in the art will understand that various modifications may be made without departing from the true spirit and full scope of the claims appended hereto.

What is claimed is:

1. A method of making a vacuum insulated glass (VIG) window unit, the method comprising:
    seating a VIG window on a window sash, the window sash configured to support a non-vacuum insulated glass window which has a larger width than does the VIG window, said VIG window being supported on a first side by a stop portion of said window sash and having a width less than the width of said non-vacuum insulated glass window, and wherein the VIG window comprises first and second glass substrates having a vacuum cavity provided therebetween, the vacuum cavity being at pressure less than atmospheric pressure and having a plurality of spacers therein for spacing the first and second glass substrates from each other;
    installing a VIG stop so that the VIG stop is connected to said window sash and supports a second side of said VIG window opposite said first side, wherein said VIG stop has a width sufficient to compensate for a difference in the width of said non-vacuum insulated glass window and said VIG window, and wherein the VIG stop comprises foam in a hollow interior portion thereof;
    wherein said VIG stop comprises a hollow L-shaped main body with first and second solid parallel distal portions extending therefrom, the first distal portion for engaging the VIG window and the second distal portion for fitting under a lip of the sash; and
    a concave dimple defined in an upper surface of the window sash when viewed in cross section, the concave dimple is positioned so as to be located between and not directly under the first and second glass substrates of the non-vacuum insulated glass window, and so that at least part of the first and second glass substrates of the VIG window are located on one side of the dimple when the VIG window is on the sash.

2. The method of claim 1, further comprising: removing an existing stop from said window sash and replacing the existing stop with the VIG stop, said existing stop having supported a previously installed non-vacuum insulated glass window with the larger width.

3. The method of claim 2, further comprising: after removing the existing stop, removing a non-vacuum insulated glass window and thereafter seating the VIG window and installing the VIG stop to replace the existing stop.

4. The method of claim 2, wherein a width of said VIG stop is greater than a width of the existing stop that was used to support a non-vacuum insulated glass window.

5. The method of claim 1, further comprising: preparing said window sash to receive a VIG window.

6. The method of claim 5, wherein said preparing comprises one or more of: cleaning said sash to remove debris, cleaning said sash to remove adhesive residue, applying an adhesive to the sash, and/or providing a gasket or seal on said sash to receive said VIG window.

7. The method of claim 1, wherein said VIG stop is installed to face an exterior side of said VIG window.

8. The method of claim 1, wherein said VIG stop is installed to face an interior side of said VIG window.

9. The method of claim 1, wherein a width of said VIG stop is in a range of from about 12 to 32 mm.

10. The method of claim 1, wherein said VIG stop comprises at least one material from the group consisting of: wood, rubber, plastic, PVC, fiberglass, vinyl, aluminum, and composites.

11. The method of claim 1, wherein said sash comprises at least one material from the group consisting of: wood, rubber, plastic, PVC, fiberglass, vinyl, aluminum, and composites.

12. The method of claim 1, wherein a gap defined by a minimum distance between said stop portion and said VIG stop is substantially equal to the width of the VIG window.

13. A method of replacing a non-vacuum insulated glass window with a vacuum insulated glass (VIG) window having a width less than a width of said non-vacuum insulated glass window, comprising:
removing an existing stop connected to a window sash in which said non-vacuum insulated glass window is installed, the window sash having a concave dimple defined in an upper surface thereof when viewed in cross section;
removing said non-vacuum insulated glass window from said window sash;
installing said VIG window in said window sash, wherein the VIG window comprises first and second glass substrates having a vacuum cavity provided therebetween, the vacuum cavity being at pressure less than atmospheric pressure and having a plurality of spacers therein for spacing the first and second glass substrates from each other;
installing a VIG stop having a width sufficient to compensate for a difference in a width of the removed non-vacuum insulated glass window and a width of said VIG window, said VIG stop engaging a surface of said VIG window and providing lateral support to said VIG window, the VIG stop have a width larger than that of the existing stop, and wherein the VIG stop comprises foam in a hollow interior portion thereof;
wherein said VIG stop comprises a hollow L-shaped main body with first and second solid parallel distal portions extending therefrom, the first distal portion for engaging the VIG window and the second distal portion for fitting under a lip of the sash; and
wherein the concave dimple is positioned so as to be located between and not directly under the first and second glass substrates of the non-vacuum insulated glass window, and so that at least part of the first and second glass substrates of the VIG window are located on one side of the dimple when the VIG window is on the sash.

14. The method of claim 13, further comprising: treating said window sash after removal of said existing stop to clean said sash in preparation for receiving said VIG window.

15. The method of claim 13, wherein said VIG stop is installed to face an exterior side of said VIG window.

16. The method of claim 13, wherein said VIG stop has a width of at least 5 mm greater than a width of the existing stop.

17. The method of claim 13, wherein a width of said VIG stop is in a range of from about 12 to 32 mm.

* * * * *